United States Patent [19]
Föhl

[11] Patent Number: 5,934,750
[45] Date of Patent: Aug. 10, 1999

[54] VEHICLE SEAT

[75] Inventor: Artur Föhl, Schorndorf, Germany

[73] Assignee: TRW Occupant Restraint Systems GmbH, Alfdorf, Germany

[21] Appl. No.: 08/800,023

[22] Filed: Feb. 13, 1997

[30] Foreign Application Priority Data

Feb. 26, 1996 [DE] Germany .................... 296 03 467

[51] Int. Cl.⁶ .................................................. B60N 2/42
[52] U.S. Cl. .................................. 297/216.12; 297/408
[58] Field of Search ...................... 297/216.1, 216.12, 297/408

[56] References Cited

U.S. PATENT DOCUMENTS

| | | | |
|---|---|---|---|
| 3,838,870 | 10/1974 | Hug | 297/216.12 X |
| 4,236,750 | 12/1980 | Moritz | 297/216.12 X |
| 4,674,792 | 6/1987 | Tamura et al. | 297/408 |
| 5,290,091 | 3/1994 | Dellanno et al. | 297/408 X |
| 5,378,043 | 1/1995 | Viano et al. | 297/216.12 X |

FOREIGN PATENT DOCUMENTS

| | | |
|---|---|---|
| 0627340 | 12/1994 | European Pat. Off. . |
| 2301906 | 12/1996 | United Kingdom . |
| 9606752 | 3/1996 | WIPO . |

*Primary Examiner*—Peter R. Brown
*Attorney, Agent, or Firm*—Tarolli, Sundheim, Covell, Tummino & Szabo

[57] ABSTRACT

In the event of a rear end collision the headrest of a vehicle seat is moved from a normal initial position to a position approximate to the vehicle occupant's head under the effect of inertial forces occurring at a mass coupled to the headrest, thereby reducing the distance between the vehicle occupant's head and the headrest.

20 Claims, 3 Drawing Sheets

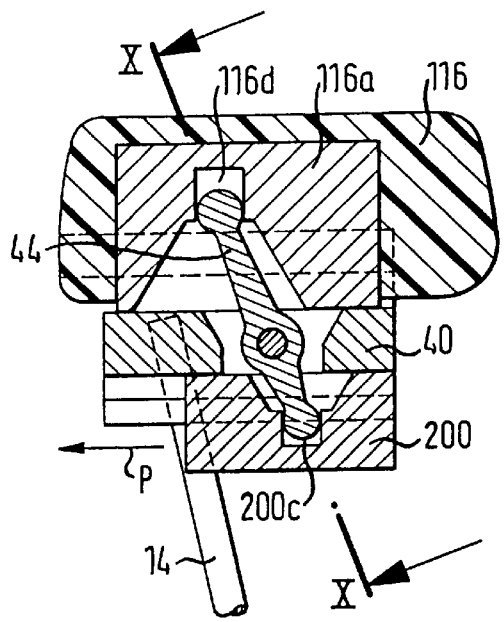
FIG. 9
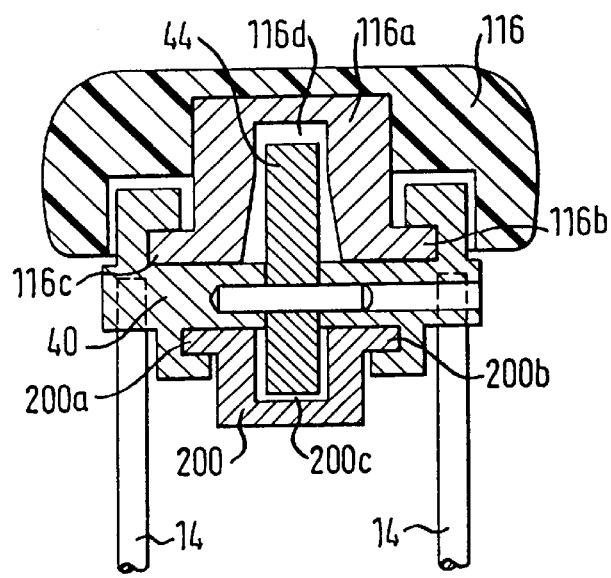
FIG. 10
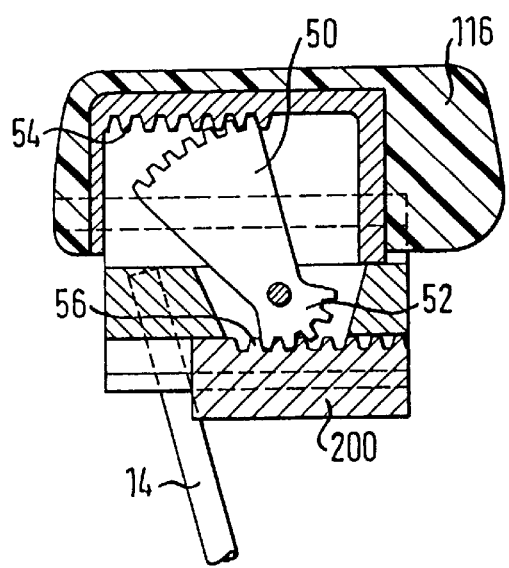
FIG. 11
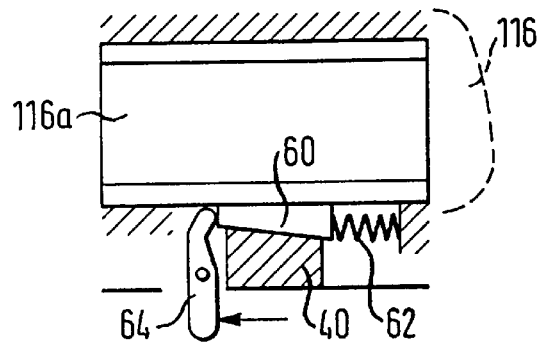
FIG. 12
FIG. 13

VEHICLE SEAT

The present invention relates to a vehicle seat with a backrest and a headrest adjustably mounted on the backrest.

BACKGROUND OF THE INVENTION

A headrest prevents among other things, in case of a rear end vehicle collision, the head of a vehicle occupant from being jolted to the rear relative to the vehicle. Usually, headrests are insertable and height-adjustable in the backrest. In addition, there are headrests which are configured as an elongated, fixed part of the backrest of the vehicle seat. As regards the headrests currently existing in vehicles, irrespective of whether the headrests concerned are adjustable or non-adjustable, in the case of rear end collision the cervical vertebra of the vehicle occupant is exposed to high loads because the distance of the head from the headrest despite the back being in contact with the backrest may be relatively large (up to 160 mm).

To prevent these loads it has already been proposed to accommodate a small air bag in the headrest. In case of a collision a gas generator is activated via a sensor to fill the air bag within a few milliseconds. Since, however, the distance of the head from the air bag may differ very greatly, the head, for instance in the case of a very small head/headrest distance, would even be bumped by the air bag which constitutes an undesirable load.

Means have also been proposed which, in case of a collision, correct support for the head via spring stored energy or pyrotechnical means via a corresponding activation means so that on head contact the support instantly remains in position in each case. For control, corresponding sensors are arranged on the surface of the head support. Although the thus created means has achieved very positive results in testing, it has not gone into series production because of the high technical expense involved therein.

SUMMARY OF THE INVENTION

It is the object of the invention to provide by cost-effective production a vehicle seat with a headrest which reduces the forces affecting the head and nape region in the case of vehicle rear end collision. This object is achieved by a vehicle seat with a backrest and a headrest adjustably mounted on the backrest. The headrest is provided with a mass body coupled thereto and is movable from a normal initial position to a position approximate to a vehicle occupant's head under the effect of inertial forces occurring at said mass body in a rear end vehicle collision. In accordance with the gist of the invention, for shifting the headrest towards the head of the occupant, use is made of the mass inertia of a mass coupled to the headrest. Due to this mass the total weight of the vehicle seat is increased only unsubstantially; as compared to active achievements of the aforementioned kind, for example in employing a spring force storage, no weight disadvantages materialize.

The invention can be embodied basically in two variants. In accordance with the first embodiment the headrest is swivable about a horizontal axis, its center of gravity being below this axis. The headrest then has the effect of a two-armed lever, at the lower lever arm of which an inertial body integrated in the headrest is effective. The upper lever arm, which is substantially longer than the lower one, is formed by the main body of the headrest.

In the second embodiment the headrest is translatory shiftable, and a separate inertial body is coupled to the headrest via a two-armed deflection element swivable about a horizontal axis. The swivable deflection element acts as a two-armed lever, the lower end of which is coupled to the inertial body and the upper end of which to the headrest. In this embodiment too, the upper lever arm is substantially longer than the lower one, so that the headrest executes a travel from the initial position to the position approximate to the vehicle occupant's head, this travel being substantially greater than the travel simultaneously passed through by the mass.

In other embodiments the headrest is preferably locked in the position approximate to the head of the occupant by a reverse travel inhibiting means. For this reverse travel inhibiting means a variety of versions come into consideration which will not be detailed in the following description of several embodiments of the invention.

BRIEF DESCRIPTION OF THE DRAWINGS

In the attached drawing:

FIG. 9 is a cross-sectional view of a headrest of the vehicle seat according to a second embodiment;

FIG. 10 is a section view along line X—X in FIG. 9;

FIG. 11 is a variant of the above embodiment in cross-section;

FIG. 12 is a schematic arrangement of a reverse travel inhibiting means, configured as a spring-loaded wedge brake; and FIG. 13 is a schematic arrangement of a latching-type reverse travel inhibiting means.

DETAILED DESCRIPTION OF THE INVENTION

Figure 1:
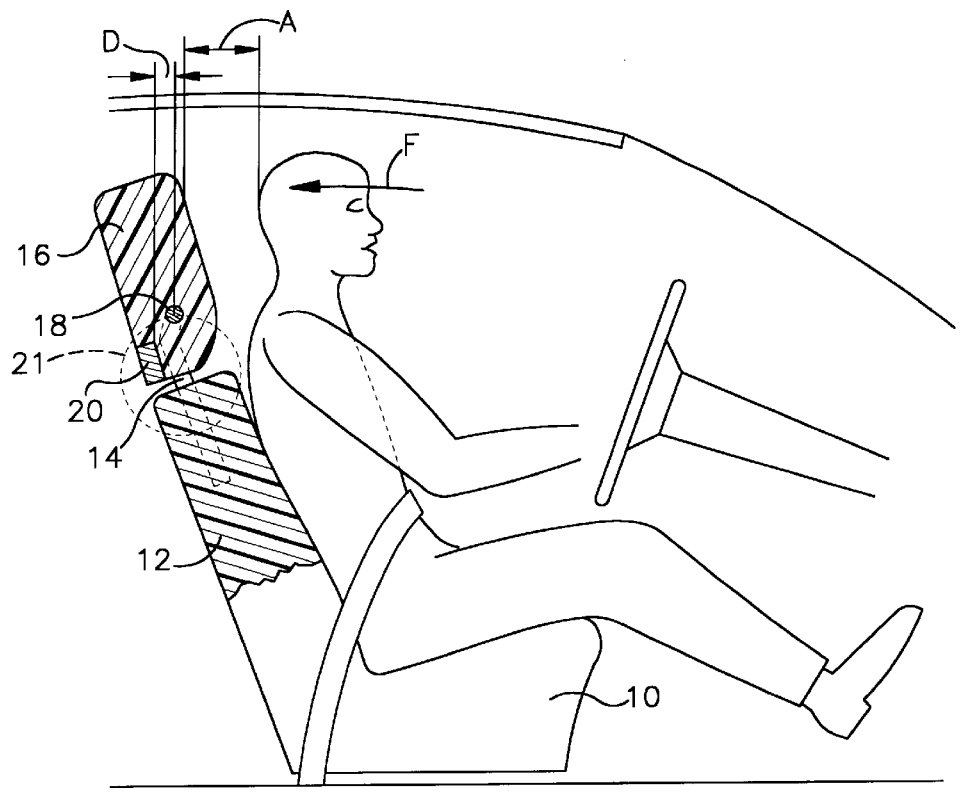
FIG. 1 is a partially sectioned schematic side view of a first embodiment of the vehicle seat in the normal use position.
Figure 2:
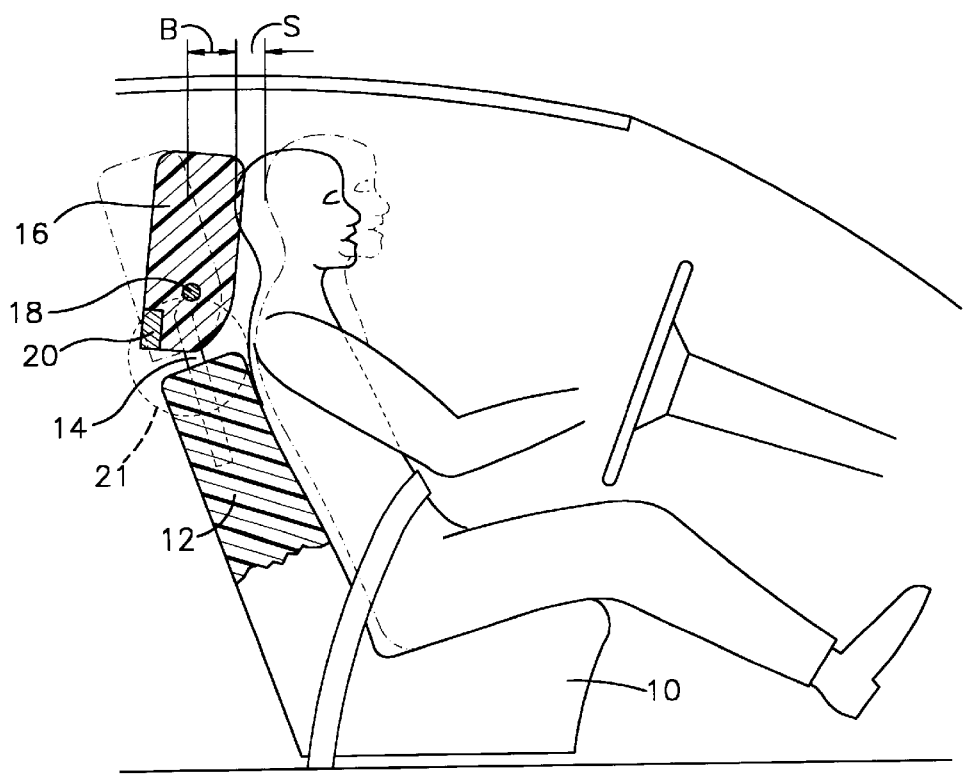
FIG. 2 is a corresponding view of the vehicle in the case of a rear end collision.

The vehicle seat 10 shown in FIGS. 1 and 2 is provided with a conventionally configured backrest 12 from which the two mounting rods 14 of a mounting bracket protrude upwards, on which a headrest 16 is swivably mounted. By means of the mounting arms 14 inserted in the backrest 12 the headrest 16 is height-adjustable in the usual manner. Swivelling the headrest 16 occurs about an axis 18 provided at the upper ends of the mounting rods 14. In the lower rear part of the headrest 16 an inertial body 20 is integrated, which is dimensioned sufficiently large that the center of gravity of the headrest 16 is located all-in-all below the axis 18. The headrest 16 thus forms a two-armed lever the lower, shorter lever arm of which is coupled to the inertial body 20 and the upper, longer lever arm of which is formed by the main body of the headrest.

In the normal initial position shown in FIG. 1 the inertial body 20 is displaced to the rear with respect to the axis 18 by a distance D, resulting in a moment being exerted on the headrest 16 which tends to swivel it counter-clockwise into the initial position against a stop. Between the head of the occupant and the opposing part of the headrest 16 a spacing "A" normally remains which may amount up to 160 mm.

In a rear end collision of the vehicle the head of the occupant is jolted rearwards in the direction of an arrow F in FIG. 1 relative to the vehicle seat. Due to the inertial mass of the inertial body 20 a moment is exerted on the headrest 16 causing it to be swivelled clockwise in the direction of the head of the occupant. The headrest thus arrives at a position approximate to the vehicle occupant's head, as shown in FIG. 2, so that the head movement is already halted by the headrest 16 after a short travel which is denoted in FIG. 2 by S. The headrest 16 has then executed a travel B in the region at which the head of the occupant comes into contact therewith. As compared to the original head spacing "A" the travel S is greatly reduced, resulting in the load on the occupant in the region of the cervical vertebra being reduced to a bearable degree.

As compared to active variants in which the headrest is adjusted by an outside force, for example by a pyrotechnical charge, this embodiment of the vehicle seat according to the invention proves to be not only simpler and less complicated, it also has functional advantages as compared thereto. Whilst namely the activation of an adjustment mechanism operating with stored energy takes some time, the adjustment of the headrest by the achievement according to the invention occurs directly on occurrence of the vehicle acceleration caused by the rear end collision. In a rear end collision calculations are usually based on a mean vehicle acceleration of roughly 8 g. With no adjustment of the headrest the head of the occupant would impact the headrest at a velocity of 5 m/sec. Assuming a head mass of 6 kg and a damping travel at the headrest of about 30 mm the head experiences a load of approx. 2,500N. At such a load, injuries in the region of the cervical vertebra are inevitable.

By contrast, a considerable reduction in the loading is achieved by the configuration of the vehicle seat according to the invention. In the embodiment shown in FIGS. 1 and 2 the ratio of the lever arms involved is roughly 1:3. As a result, on the inertial forces becoming effective, the headrest is displaced to the head of the occupant three-times quicker than the movement of the common mass center of gravity of the headrest in the opposite direction. The head of the occupant impacts the headrest 16 after a distance S of approx. 40 mm at a velocity of 2.5 m/sec. Again assuming a damping travel of 30 mm at the headrest the load on the head is a mere 630N. Accordingly, what is achieved is a reduction in the loading by roughly 75%. The loading in the region of the cervical vertebra is also strongly reduced by the travel being reduced to a quarter.

A further contribution towards reducing the load is achievable by configuring the upholstery of the headrest substantially harder than that of the backrest in the region of the shoulder support. The occupant is then able to sink deeper into the upholstery of the backrest so that the distance between head and headrest is further reduced. In this configuration it is also of advantage that the inertial body 20 is able to be dimensioned smaller so that the headrest is moved against the head more gently.

The headrest 16 may also be maintained in its initial position as shown in FIG. 1 by a spring, a shear pin or the like in the region 21.

The headrest needs to be locked in its position approximate to the head of the occupant by a reverse travel inhibiting means. Various configurations of a suitable reverse lock inhibiting means are shown in FIG. 3 to FIG. 8.

Figure 3:
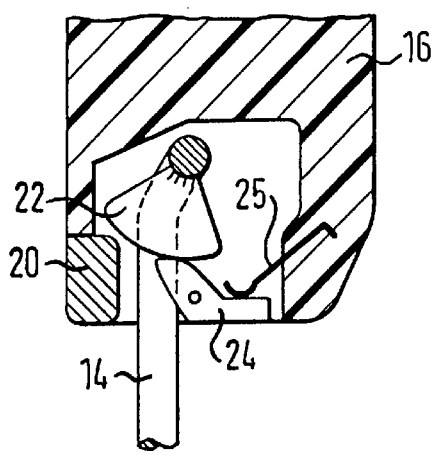
FIG. 3 is a cross-sectional view of a reverse travel inhibiting means, formed by a spring-loaded friction lock.

In the embodiment shown in FIG. 3 the reverse lock inhibiting means consist of a friction lock having a cam 22 fixedly attached to the upper end of the mounting rods 14 and a two-armed lever 24 swivably mounted on the headrest 16, this lever being urged into friction engagement with the surface of the cam 22 by a spring 25. The spring-loaded lever arm simultaneously serves as a handle, the actuation of which enables the reverse travel inhibiting means to be released, so that the headrest can be returned to its initial position.

Figure 4:
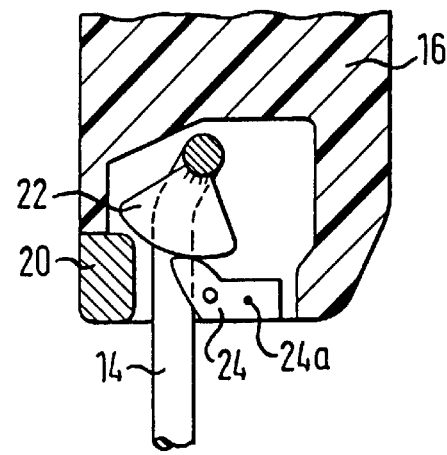
FIG. 4 is a cross-sectional view of a reverse travel inhibiting means comprising a clamping lever loaded by its own weight.

The embodiment shown in FIG. 4 differs from that shown in FIG. 3 merely by the configuration of the two-armed lever 24 which, in this case, is not urged by a separate spring but by its own weight acting at its center of gravity 24a.

Figure 5:
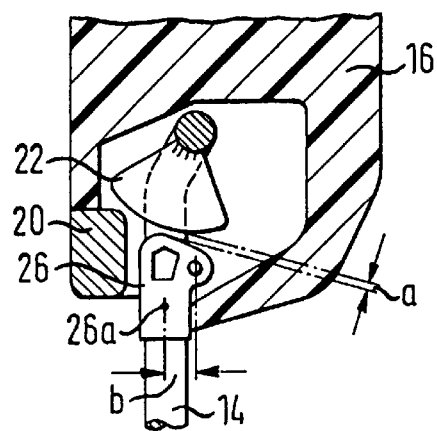
FIG. 5 is a cross-sectional view of a reverse travel inhibiting means which is automatically activated by head contact with the headrest.

In the embodiment as evident from FIG. 5 a cam 22 is in turn provided which is configured for example as a segment of a curve and to which the bracket part connecting the mounting rods 14 is welded. Coacting with the cam 22 is an eccentric lever 26 swivably mounted eccentrically on the headrest 16. In the normal initial position the eccentric lever 26 maintains a slight spacing "a" away from the surface of the cam 22. The center of gravity 26a of the eccentric lever 26 is displaced by the dimension "b" with respect to the swivel axis. Under the effect of the inertial forces produced by the deceleration of the headrest 16 on coming into contact with the head of the occupant, a torque results due to this displacement by the dimension "b" which causes the eccentric lever 26 to be swivelled against the surface of the cam 22. In this embodiment the reverse lock inhibiting means is thus not activated until a rear end collision occurs.

Figure 6:
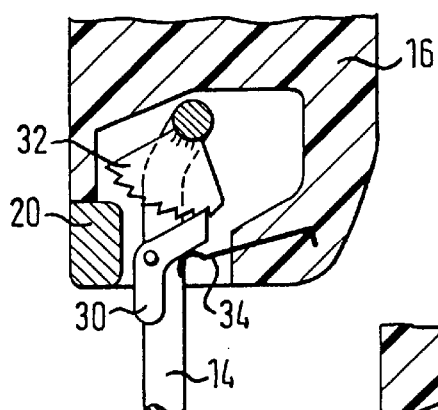
FIG. 6 is a cross-sectional view of one embodiment of a reverse travel inhibiting means formed by a pawl lever and a gear segment.

In the embodiment shown in FIG. 6 the reverse lock inhibiting means consists of a pawl lever 30 swivably mounted on the headrest 16 and a ratchet member 32 rigidly attached to the mounting bracket of the headrest, this ratchet member being provided with a ratchet. Due to a spring 34 the pawl lever 30 is urged to engage the ratchet. In this embodiment the headrest 16 can be swivelled in increments and is arrested in each increment of the swivel movement. By manual actuation of the pawl lever 30 the arrest can be released to enable the headrest 16 to be returned to its initial position.

Figure 7:
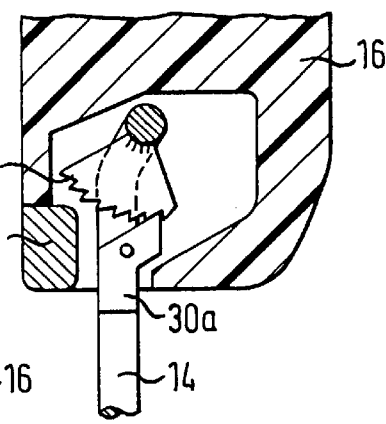
FIG. 7 is a cross-sectional view of an analog embodiment of a reverse travel inhibiting means in which the pawl lever is loaded by its own weight.

Analogous to the embodiment in FIG. 4 the pawl lever 30a in the variant shown in FIG. 7 is urged not by a separate spring but by its own weight.

Figure 8:
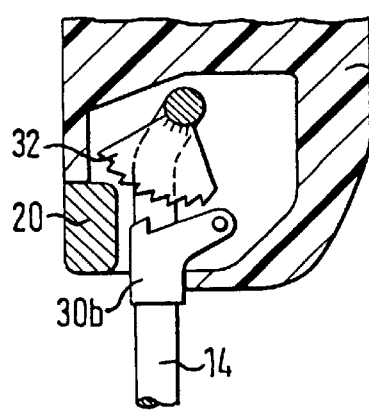
FIG. 8 is a cross-sectional view of an embodiment of a reverse travel inhibiting means in which the pawl lever is activated by mass inertia.

In conclusion FIG. 8 shows a variant in which the pawl lever 30b analogous to the variant of FIG. 5 does come into engagement with the ratchet member 32 by mass inertia, but not until deceleration of the headrest 16 occurs.

In the embodiment shown in FIGS. 9 and 10 the headrest 116 is shiftable not by swivel action but by a translatory action. At the upper ends of the mounting rods 14 a guide part 40 is rigidly attached. The headrest 116 is guided on the guide part 40 slidingly shiftable in the horizontal direction. For the guiding purpose the core 116a of the headrest 116 is provided with ledges 116b, 116c protruding sideways which are shiftably guided in the guide grooves of the guide part 40. On the underside of the guide part 40 a correspondingly formed guide for a separate inertial body 200 is formed which is also provided with guide ledges 200a, 200b protruding sideways. Swivably mounted on the guide part 40 a deflection element is further provided in the form of a two-armed deflection lever 44. The lower, substantially shorter lever arm of this deflection lever 44 engages by its barrel-rounded end in a recess 200c of the inertial body 200. The upper, substantially longer lever arm engages by its also barrel-rounded end in a recess 116d on the core 116a of the headrest 116. The inertial body 200 is thus coupled to the headrest 116 by the deflection lever 44.

In a rear end collision situation the inertial body 200 is displaced relative to the vehicle rearwards in the direction of an arrow P in FIG. 9. The deflection lever 44 translates the travel of the inertial body 200 into an oppositely oriented travel of the headrest 116 magnified by the ratio of the length of its lever arms. The same as in the embodiment described previously the headrest 116 is thus brought into the vicinity of the head of the occupant.

The embodiment of FIG. 11 differs from that of FIG. 9 and FIG. 10 merely by the configuration of the deflection element which in this case is formed by two rigidly coupled gear segments 50, 52 swivably mounted about a horizontal axis on the headrest 116. These two gear segments 50, 52 form in turn a two-armed lever, the upper lever arm being substantially longer than the lower one. The upper gear segment 50 meshes with a rack 54 on the headrest 116, whilst the low gear segment 52 meshes with a rack 56 on the inertial body 200. The way in which this works is the same as that already described for the preceding embodiment.

A reverse travel inhibiting means is also necessary in the embodiments shown in FIGS. 9 to 11 with a translatory shiftable headrest. FIGS. 12 and 13 show two versions of a reverse travel inhibiting means which is suitable for a translatory shiftable headrest.

In the embodiment of FIG. 12 a wedge-shaped braking body 60 is urged by a spring 62 against the underside of the core 116a of the headrest 116. The braking body 60 is supported by a ramped surface on the guide part 40. In addition, a two-armed release lever 64 is swivably mounted on the guide part 40. This reverse lock inhibiting means 64 presses by its upper end against the braking body 60, when its lower end is manually actuated, enabling the braking body to be moved against the force of the pressure spring 62 into a release position, so that the headrest 116 can be moved back into its initial position.

In the embodiment of FIG. 13 a ratchet 70 is configured on the underside of the core 116a of the headrest. A two-armed pawl lever 72 swivably mounted on the guide part is maintained in locking engagement with the ratchet 70 by a spring 74. By manual actuation of the pawl lever 72 the latching action can be released.

I claim:

1. A vehicle seat with a backrest, a headrest and support means to adjustably mount the headrest on said backrest, said headrest being provided with a mass body coupled thereto, said mass body being located to enable a displacement of the headrest relative to the support means in case of a force acting on the mass body and said headrest being movable from an initial position for use to a position in which the headrest is displaced for a predetermined distance mainly to the front of the vehicle under the effect of forces occurring at said mass body in a rear vehicle collision, said forces being caused by the inertia of the mass body.

2. The vehicle seat as set forth in claim 1, wherein said headrest is provided with a horizontal axis connecting said headrest with said support means, said headrest being swivable about said axis and its center of gravity being below said axis.

3. The vehicle seat as set forth in claim 2, wherein said support means comprises a mounting bracket which protrudes from said backrest, said horizontal axis being formed at said mounting bracket.

4. The vehicle seat as set forth in claim 2, wherein said mass body is formed by a separate inertial body and said headrest forms a two-armed lever with an upper lever arm and a lower lever arm, said upper lever arm being substantially longer than said lower lever arm which has said separate inertial body coupled thereto, said separate inertial body being integrated in said headrest.

5. The vehicle seat as set forth in claim 1, wherein said headrest is arranged translatory shiftable on said support means and is provided with a two-armed deflection element swivable about a horizontal axis connected with said support means, said headrest and said mass body being coupled by said two-armed deflection element.

6. The vehicle seat as set forth in claim 3, wherein said mass body is formed by a separate inertial body and said support means is provided with a guide part, said headrest being mounted slidingly shiftable on the guide part, at which also said separate inertial body is guided slidingly shiftable and said deflection element being swivably mounted.

7. The vehicle seat as set forth in claim 6, wherein said two-armed deflection element comprises an upper lever arm and a lower lever arm, said upper lever arm positively connected to said headrest being configured substantially longer than said lower lever arm positively engaging said inertial body.

8. The vehicle seat as set forth in claim 7, wherein said headrest and said inertial body are each provided with a rack, said deflection element is formed by an upper and a lower gear segment rigidly coupled with each other and swivably mounted about the horizontal axis, said upper gear segment meshing with said rack on said headrest being configured substantially larger than said lower gear segment which meshes with said rack on said inertial body.

9. The vehicle seat as set forth in claim 6, wherein said backrest is provided with two mounting arms protruding from said backrest, said guide part being secured to the mounting arms.

10. The vehicle seat as set forth in claim 1, wherein said headrest comprises a region for contacting the head of a vehicle occupant which, during the movement of the headrest from the initial position for use to the position in which the headrest is displaced for a predetermined distance mainly to the front of the vehicle, covers a distance which is substantially greater than a distance simultaneously passed through by said mass body.

11. The vehicle seat as set forth in claim 1, wherein said headrest is translatory shiftable and is provided with a deflection element swivable about a horizontal axis, said headrest and said mass body being coupled by said deflection element, said mass body being formed by a separate inertial body, said headrest and said inertial body being each provided with a recess, said deflection element forming a two-armed swivel lever with an upper end and a lower end, said upper end and said lower end being both barrel-rounded, said upper end engaging said recess of said headrest and said lower end engaging said recess of said inertial body.

12. The vehicle seat as set forth in claim 1, wherein said headrest is urged by spring force into the initial position for use.

13. The vehicle seat as set forth in claim 1, wherein said headrest is maintained in the initial position for use by a shearable holding element.

14. The vehicle seat as set forth in claim 1, wherein said backrest comprises a region for shoulder support of a vehicle occupant, said headrest being provided with a harder upholstering material than said region for shoulder support.

15. The vehicle seat as set forth in claim 1, wherein said headrest is locked in the position in which the headrest is displaced for a predetermined distance mainly to the front of the vehicle by a reverse travel inhibiting means selectively engaging said headrest and said support means.

16. The vehicle seat as set forth in claim 15, wherein said reverse travel inhibiting means is deactivatable by a manual actuating element being coupled to said reverse travel inhibiting means.

17. The vehicle seat as set forth in claim 15, wherein said reverse travel inhibiting means is activatable by the forces of inertia occurring on deceleration of said headrest in its position in which the headrest is displaced for a predetermined distance mainly to the front of the vehicle.

18. The vehicle seat as set forth in claim 15, wherein said reverse travel inhibiting means comprises a locking lever swivably mounted outside of its center of gravity.

19. The vehicle seat as set forth in claim 15, wherein a ratchet member is provided, said ratchet member being attached to one of said support means and said headrest and said reverse travel inhibiting means comprises a swivable locking lever being mounted on the other of said support means and said headrest which engages the ratchet member by friction action or positively.

20. The vehicle seat as set forth in claim 19, wherein said support means comprises a mounting bracket which protrudes from said backrest.

* * * * *